United States Patent
Huang et al.

(10) Patent No.: US 11,550,386 B2
(45) Date of Patent: Jan. 10, 2023

(54) HANDHELD ELECTRONIC DEVICE

(71) Applicant: HTC Corporation, Taoyuan (TW)

(72) Inventors: Pei-Pin Huang, Taoyuan (TW); Chang-Hua Wei, Taoyuan (TW); Chih Chien Chen, Taoyuan (TW); Chun-Kai Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/687,677

(22) Filed: Mar. 7, 2022

(65) Prior Publication Data

US 2022/0350397 A1  Nov. 3, 2022

Related U.S. Application Data

(60) Provisional application No. 63/183,070, filed on May 3, 2021.

(51) Int. Cl.
  *G06F 3/01* (2006.01)
  *G06F 3/0346* (2013.01)

(52) U.S. Cl.
  CPC ............ *G06F 3/011* (2013.01); *G06F 3/0346* (2013.01)

(58) Field of Classification Search
  None
  See application file for complete search history.

(56) References Cited

U.S. PATENT DOCUMENTS

| 11,395,962 B2 | 7/2022 | Lin et al. |
| 2020/0201045 A1* | 6/2020 | Liu ............... H04N 5/2253 |
| 2021/0231962 A1* | 7/2021 | Hudman ............ G02B 27/0176 |

FOREIGN PATENT DOCUMENTS

| CN | 212112405 | 12/2020 |
| TW | 202032316 | 9/2020 |

OTHER PUBLICATIONS

"Search Report of Europe Counterpart Application", dated Sep. 14, 2022, p. 1-p. 7.
"Office Action of Taiwan Counterpart Application", dated Nov. 9, 2022, p. 1-p. 6.

* cited by examiner

*Primary Examiner* — Aneeta Yodichkas
(74) *Attorney, Agent, or Firm* — JCIPRNET

(57) ABSTRACT

A handheld electronic device including a holding assembly and a tracking assembly is provided. The tracking assembly includes a main body and a plurality of trackers. The main body is connected to the holding assembly and has an inner surface and an outer surface. The trackers are disposed on the inner surface and the outer surface of the main body. The trackers arranged on the outer surface and a part of the trackers arranged on the inner surface are exposed to the outside in a top view direction and are arranged in interleaving.

9 Claims, 4 Drawing Sheets

HANDHELD ELECTRONIC DEVICE

CROSS-REFERENCE TO RELATED APPLICATION

This application claims the priority benefit of U.S. provisional application Ser. No. 63/183,070, filed on May 3, 2021. The entirety of the above-mentioned patent application is hereby incorporated by reference herein and made a part of this specification.

BACKGROUND

Technical Field

The invention relates to a handheld electronic device, and particularly relates to a handheld electronic device serving as a controller of a virtual image display device.

Description of Related Art

Along with evolution of electronic technology, technologies for simulating sensation, perception and/or environment, such as virtual reality (VR), augmented reality (AR), mixed reality (MR) or extended reality (XR) are quite popular today. In order to enable a user to take a simulated environment as a real environment, a position of the user or an operating hand in space must be obtained, so that a display image on a virtual reality, augmented reality, mixed reality or extended reality display may be changed according to the position corresponding to the user or the operating hand. For example, a virtual reality product may include a handheld controller and a display, and a position of the handheld controller may be tracked, and according to a tracked position corresponding to the handheld controller, an action of the operating hand of the user in the display image of the display may be moved.

At present, a most common design of the handheld controller is a ring-shaped tracking object, which adopts an external detector to detect light-emitting diodes on the ring-shaped tracking object to serve as a basis for positioning in space. However, when viewing from above, the detector may only detect the light-emitting diodes located on an outer surface of the ring-shaped tracking object. Namely, the light-emitting diodes on an inner surface of the ring-shaped tracking object will be shielded by the ring-shaped tracking object when viewing from above and cannot be detected, thus resulting in a low tracking effect.

SUMMARY

The invention is directed to a handheld electronic device, which may provide a more accurate optical positioning effect.

The invention provides a handheld electronic device suitable for serving as a controller of a virtual image display device. The handheld electronic device includes a holding assembly and a tracking assembly. The tracking assembly includes a main body and a plurality of trackers. The main body is connected to the holding assembly and has an inner surface and an outer surface. The trackers are disposed on the inner surface and the outer surface of the main body. The trackers arranged on the outer surface and a part of the trackers arranged on the inner surface are exposed to the outside in a top view direction and are arranged in interleaving.

Based on the above description, in the design of the handheld electronic device of the invention, the trackers disposed on the outer surface of the main body and a part of the trackers disposed on the inner surface of the main body are exposed to the outside in the top view direction and are arranged in interleaving. Therefore, compared with the ring-shaped tracking object in the conventional technology, the design of the tracking assembly of the invention may easily expose the trackers on the inner surface to the outside for being detected by the detector, so that the number of the detected trackers is increased, and the handheld electronic device of the invention may have a more accurate optical positioning effect.

To make the aforementioned more comprehensible, several embodiments accompanied with drawings are described in detail as follows.

DESCRIPTION OF THE EMBODIMENTS

Figure 1A:
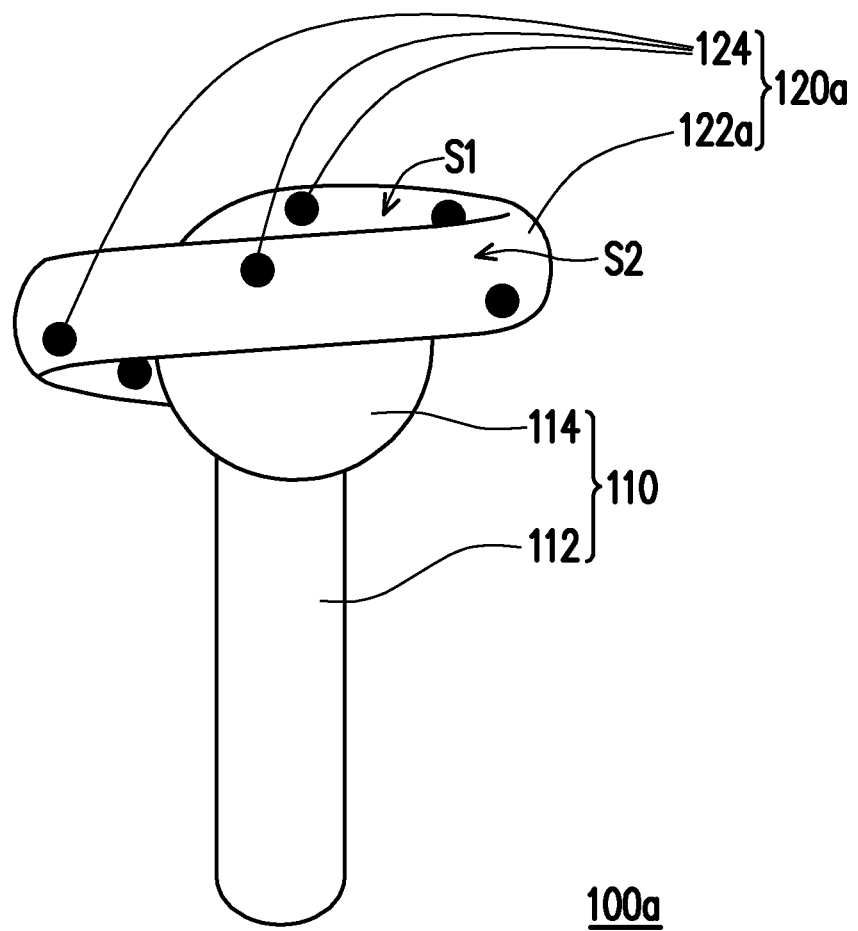
FIG. 1A is a schematic top view of a handheld electronic device according to an embodiment of the invention.
Figure 1B:
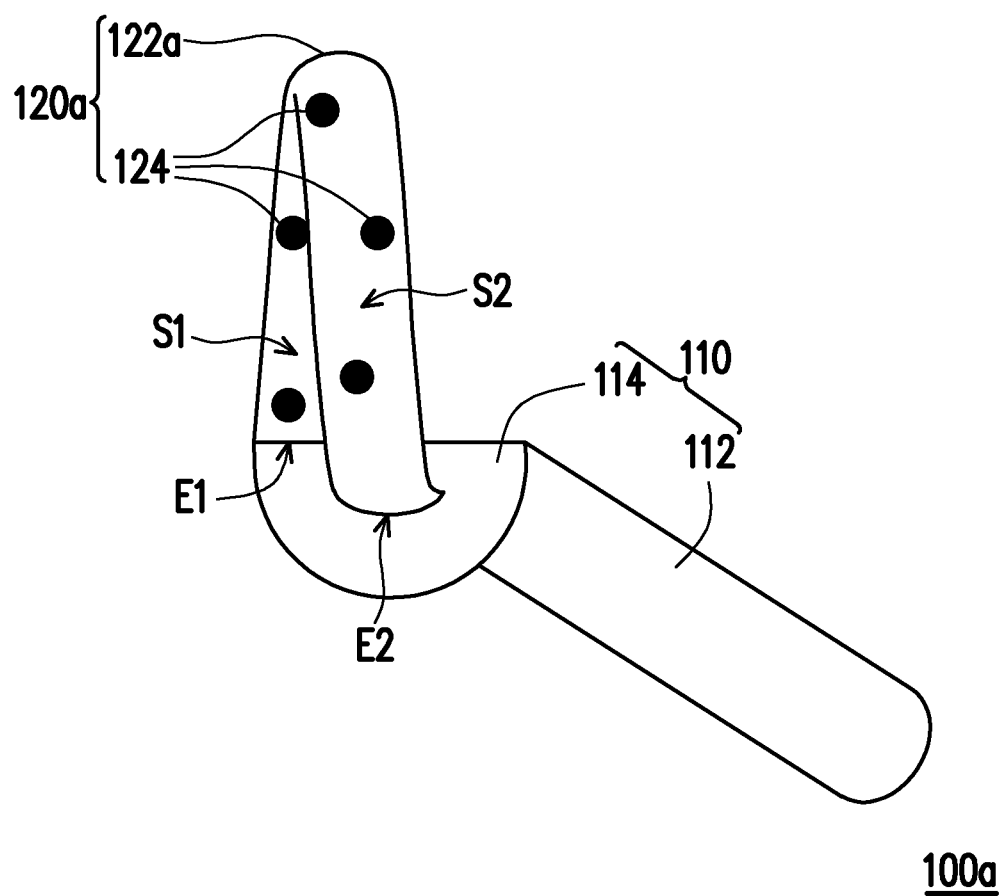
FIG. 1B is a schematic side view of the handheld electronic device of FIG. 1A.

FIG. 1A is a schematic top view of a handheld electronic device according to an embodiment of the invention. FIG. 1B is a schematic side view of the handheld electronic device of FIG. 1A. Referring to FIG. 1A and FIG. 1B at the same time, in the embodiment, the handheld electronic device 100a is suitable for serving as a controller of a virtual image display device. The handheld electronic device 100a is suitable for forming a virtual reality product with a virtual image display device (not shown), and a position of the handheld electronic device 100a may be tracked by the virtual image display device. An action of an operating hand of a user in a display image of the virtual image display device may be moved according to a tracked position corresponding to the handheld electronic device 100a.

In detail, the handheld electronic device 100a of the embodiment includes a holding assembly 110 and a tracking assembly 120a. The tracking assembly 120a includes a main body 122a and a plurality of trackers 124. The main body 122a is connected to the holding assembly 110 and has an inner surface S1 and an outer surface S2. The trackers 124 are disposed on the inner surface S1 and the outer surface S2 of the main body 122a. The trackers 124 arranged on the outer surface S2 and a part of the trackers 124 arranged on the inner surface S1 are exposed to the outside in a top view direction and are arranged in interleaving.

Further, the holding assembly 110 of the embodiment includes a handle 112 and an operation platform 114. The handle 112 may be held by the user, and the operation platform 114 is connected to the handle 112, and an operation interface may be provided on the operation platform 114 for the user to touch/press. As shown in FIG. 1B, the main body 122a of the tracking assembly 120a of the embodiment has a first end E1 and a second end E2, and the first end E1 and the second end E2 are both connected to different positions of the operation platform 114, and a side surface of the main body 122a is continuous and has an asymmetrical contour when viewing in a side view. The main body 122a of the tracking assembly 120a is, for example, twisted in an S-shape or a Z-shape to form the asymmetrical contour. In an embodiment, a shape of the main body 122a of the tracking assembly 120a may be, for example, an elliptical spiral, a rectangular spiral, a Mobius spiral or a Fibonacci spiral, which is not limited by the invention.

In addition, the trackers 124 of the embodiment may be, for example, a plurality of emitters or a plurality of receivers. When the trackers 124 are emitters, the emitters may be, for example, a plurality of light-emitting diodes (LEDs), a plurality of ultrasonic emitters, a plurality of radio frequency (RF) emitters, a plurality of infrared light emitters, or a combination thereof, but the invention is not limited thereto. When the trackers 124 are receivers, the receivers may be, for example, a plurality of light sensors, a plurality of image sensors (for example, cameras), a plurality of RF receivers, a plurality of ultrasonic receivers or a combination thereof, but the invention is not limited thereto.

In addition, the trackers 124 of the embodiment may be arranged in a Fibonacci sequence or a zig zag pattern on the main body 122a, but the invention is not limited thereto. In an embodiment, the main body 122a may be made of a transparent material, or may be transparent under light of a specific wavelength. Namely, the trackers 124 may be placed on the transparent main body 122a, so the detector may detect the trackers 124 on the inner surface S1 and the outer surface S2 from all angles. In an embodiment, an optical element may be provided on the tracker 124 to focus the emitted light or to expand a receiving range. In an embodiment, grooves or protrusions may be provided around the trackers 124 for better signal reception or transmission. In an embodiment, an optically visible pattern may be formed along the shape of the main body 122a to assist positioning of the trackers 124.

In brief, since the trackers 124 disposed on the outer surface S2 of the main body 122a and a part of the trackers 124 disposed on the inner surface S1 of the main body 122a are exposed to the outside in the top view direction and are arranged in interleaving, compared with the ring-shaped tracking object in the conventional technology, according to the design of the tracking assembly 120a of the embodiment, the trackers 124 on the inner surface S1 may be more easily exposed to the outside without being shielded by the main body 122a, which may increase the number of the detected trackers 124, thereby improving the optical positioning effect, so that the handheld electronic device 100a of the embodiment may have a more accurate optical positioning effect.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 2A:
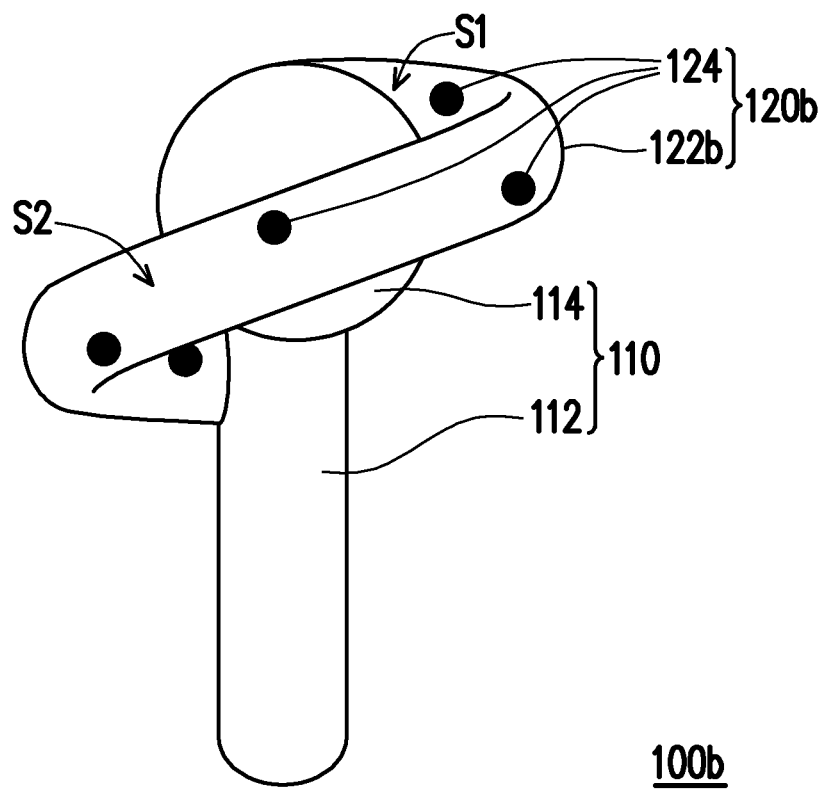
FIG. 2A is a schematic top view of a handheld electronic device according to another embodiment of the invention.
Figure 2B:
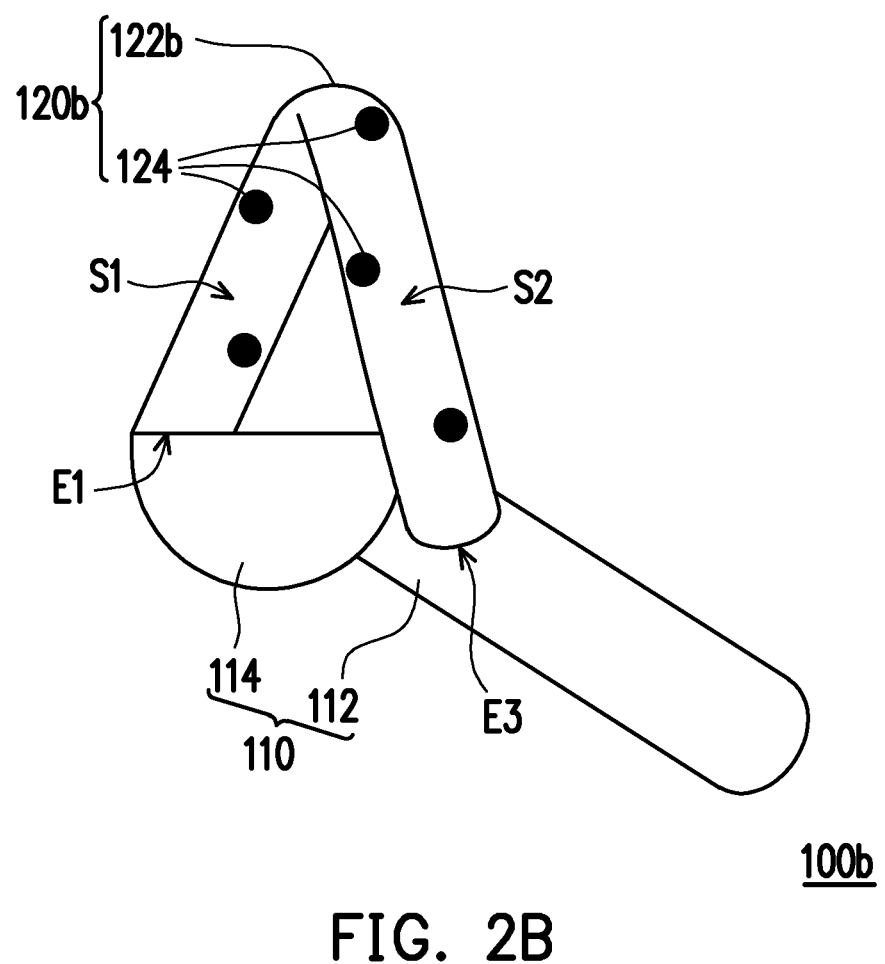
FIG. 2B is a schematic side view of the handheld electronic device of FIG. 2A.

FIG. 2A is a schematic top view of a handheld electronic device according to another embodiment of the invention. FIG. 2B is a schematic side view of the handheld electronic device of FIG. 2A. Referring to FIG. 1B, FIG. 2A and FIG. 2B at the same time, a handheld electronic device 100b of the embodiment is similar to the above-mentioned handheld electronic device 100a, and differences between the two are that in the embodiment, the first end E1 of a main body 122b of a tracking assembly 120b is connected to the operation platform 114, and a second end E3 of the main body 122b is connected to the handle 112. In this way, from the top view direction of FIG. 2A and the side view direction of FIG. 2B, the trackers 124 disposed on the inner surface S1 may be easily exposed to the outside, which may increase the number of the detected trackers 124, so that the handheld electronic device 100b of the embodiment may have a more accurate optical positioning effect.

In brief, the shapes of the main bodies 122a and 122b of the tracking assemblies 120a and 120b of the embodiment have asymmetrical contours, so that blind spots of the ring-shaped tracking object in the conventional technology may be reduced, and the trackers 124 arranged on the inner surfaces S1 of the main bodies 122a and 122b may be easily detected, which avails improving accuracy of an algorithm for solving object pose through image projection points (perspective-n-point). Moreover, compared with the ring-shaped tracking object that is flat in a top view direction, the trackers 124 of the embodiment are disposed on the main bodies 122a and 122b with asymmetrical contours, and it is easier to distinguish a left hand from a right hand of the user.

In summary, in the design of the handheld electronic device of the invention, the trackers disposed on the outer surface of the main body and a part of the trackers disposed on the inner surface of the main body are exposed to the outside in the top view direction and are arranged in interleaving. Therefore, compared with the ring-shaped tracking object in the conventional technology, the design of the tracking assembly of the invention may easily expose the trackers on the inner surface to the outside for being detected by the detector, so that the number of the detected trackers is increased, and the handheld electronic device of the invention may have a more accurate optical positioning effect.

Although the present invention has been disclosed above with the embodiments, they are not intended to limit the present invention. It will be apparent to those skilled in the art that various modifications and variations can be made to the disclosed embodiments without departing from the scope or spirit of the invention. Therefore, the scope to be protected by the present invention shall be determined by the scope of the appended claims.

What is claimed is:

1. A handheld electronic device, suitable for serving as a controller of a virtual image display device, and comprising:
   a holding assembly; and
   a tracking assembly, comprising a main body and a plurality of trackers, the main body being connected to the holding assembly and having an inner surface and an outer surface, and the trackers being disposed on the inner surface and the outer surface of the main body, wherein the trackers arranged on the outer surface and a part of the trackers arranged on the inner surface are exposed to the outside in a top view direction and are arranged in interleaving,
   wherein the main body of the tracking assembly is twisted in an S-shape or a Z-shape to present an asymmetrical contour.

2. The handheld electronic device as claimed in claim 1, wherein the holding assembly comprises:
   a handle; and
   an operation platform, connected to the handle.

3. The handheld electronic device as claimed in claim 2, wherein the main body of the tracking assembly has a first end and a second end, the first end is connected to the operation platform, and the second end is connected to the operation platform.

4. The handheld electronic device as claimed in claim 2, wherein the main body of the tracking assembly has a first end and a second end, the first end is connected to the operation platform, and the second end is connected to the handle.

5. The handheld electronic device as claimed in claim 1, wherein each of the trackers is an emitter or a receiver.

6. The handheld electronic device as claimed in claim 5, wherein the emitters comprise a plurality of light-emitting diodes, a plurality of ultrasonic emitters, a plurality of radio frequency emitters, a plurality of infrared light emitters, or a combination thereof.

7. The handheld electronic device as claimed in claim 5, wherein the receivers comprise a plurality of light sensors, a plurality of image sensors, a plurality of radio frequency receivers, a plurality of ultrasonic wave receivers, or a combination thereof.

8. The handheld electronic device as claimed in claim 1, wherein the trackers are arranged in a Fibonacci sequence or in a zig zag pattern.

9. A handheld electronic device, suitable for serving as a controller of a virtual image display device, and comprising:
   a holding assembly; and
   a tracking assembly, comprising a main body and a plurality of trackers, the main body being connected to the holding assembly and having an inner surface and an outer surface, and the trackers being disposed on the inner surface and the outer surface of the main body, wherein the trackers arranged on the outer surface and a part of the trackers arranged on the inner surface are exposed to the outside in a top view direction and are arranged in interleaving,
   wherein a shape of the main body of the tracking assembly comprises an elliptical spiral, a rectangular spiral, a Mobius spiral or a Fibonacci spiral.

* * * * *